UNITED STATES PATENT OFFICE.

HENRI SCHNEIDER, OF LE CREUZOT, FRANCE.

TEMPERING STEEL OR STEELY IRON.

SPECIFICATION forming part of Letters Patent No. 384,935, dated June 19, 1888.

Application filed November 1, 1887. Serial No. 253,997. (No specimens.)

*To all whom it may concern:*

Be it known that I, HENRI SCHNEIDER, manager of the firm of Schneider & Co., of Le Creuzot, (Saône-et-Loire,) France, and a citizen of the Republic of France, have invented certain new and useful Improvements in Tempering Steel or Steely Iron, of which the following is a specification.

This invention is based upon the utilization in the hardening process of the absorption of heat caused by the fusing or melting of a solid substance and of the fact that so long as a solid substance is melting or dissolving in a liquid substance that liquid substance cannot get appreciably hotter, except just locally round the heating-surface, the extent of this abnormal heating being dependent on the conductivity of the liquid material and heating-surface and the difference between the temperature of the heating-surface and that of the liquid at its freezing-point.

The hardening media preferably employed according to the invention are—

First, a saline bath mixed with ice or a refrigerating-mixture; second, a water bath, preferably saline, mixed with ice or a refrigerating-mixture. In both cases the ice can be introduced into the hardening-bath, or constituted and reconstituted in the bath by means of refrigerating machinery.

Third. A bath of nitrate of soda, a salt containing sufficient water to freeze at the desired temperature. This medium is more especially suitable for soft-hardening at high temperatures. Its action is regulated by adding or withdrawing water or by adding during the course of the operation hydrated or anhydrous salt.

Fourth. A solid and fusible medium in contact with the piece to be hardened, pressure being used, if necessary, to insure the contact. This medium may be ice, solid nitrate of soda, or a metal or alloy having low melting-point—lead, for instance.

The body to be hardened is plunged at the requisite temperature into the bath containing the solid melting body, or is kept under pressure in and under the preferably pulverulent or granular solid material of low melting-point until the required extraction of heat has taken place, more solid material being added in the meantime, if necessary, as that originally present melts or dissolves.

I claim as my invention—

1. The process herein described of hardening steel or other metals, said process consisting in subjecting the metal to a hardening-bath and melting or fusing a solid body therein.

2. In the process of hardening steel or other metals, the mode herein described of maintaining the hardening-bath at a nearly uniform temperature while the hardening is going on by supplying the bath with a solid substance fusing or melting at the temperature of said bath.

3. The process herein described of hardening steel or other metals, said process consisting in subjecting the metal to a hardening-bath and pressing a solid fusible substance at the temperature of the bath in contact with the article to be hardened.

In testimony whereof I have signed my name to this specification in the presence of two subscribing witnesses.

HENRI SCHNEIDER.

Witnesses:
CHARLES BREHORY,
LÉON FRANCKEN.